United States Patent [19]

Mori et al.

[11] Patent Number: 5,147,952
[45] Date of Patent: Sep. 15, 1992

[54] PROCESS FOR PRODUCING MACROMOLECULAR MONOMER

[75] Inventors: Yoshio Mori, Gifu; Makoto Watanabe; Kishiro Azuma, both of Tokai; Shiro Kojima, Yokohama, all of Japan

[73] Assignee: Toagosei Chemical Industry Co., Ltd., Tokyo, Japan

[21] Appl. No.: 750,337

[22] Filed: Aug. 27, 1991

[30] Foreign Application Priority Data

Aug. 28, 1990 [JP] Japan .................................. 2-226234

[51] Int. Cl.$^5$ .............................................. C08F 4/00
[52] U.S. Cl. .................... 526/220; 526/217; 526/312; 526/320; 526/321; 526/326; 526/329.7; 526/245
[58] Field of Search ................................ 526/220, 217

[56] References Cited

U.S. PATENT DOCUMENTS 3,842,059 10/1974 Milkovich et al. ................ 525/292

FOREIGN PATENT DOCUMENTS 0306714 3/1989 European Pat. Off. .
64-69605 3/1989 Japan .

*Primary Examiner*—Joseph L. Schofer
*Assistant Examiner*—M. Nagumo
*Attorney, Agent, or Firm*—Browdy and Neimark

[57] ABSTRACT

A process for producing a macromolecular monomer, which comprises anionic polymerization of a (meth)acrylic acid ester monomer by using, as a polymerization initiator, a compound represented by the following general formula [I]:

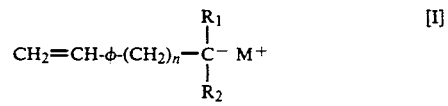

wherein $M^+$ is a quaternary ammonium ion; $\phi$ is a phenylene group; $R_1$ and $R_2$ are each an electron withdrawing group stabilizing the carbanion $C^-$, or one of them is said electron withdrawing group and the other is an alkyl group of 1-6 carbon atoms or a phenyl group; and n is an integer of 0-6.

4 Claims, No Drawings

PROCESS FOR PRODUCING MACROMOLECULAR MONOMER

The present invention relates to a process for producing a macromolecular monomer. More particularly, the present invention relates to a process for producing a macromolecular monomer of narrow molecular weight distribution having the poly(meth)acrylic acid ester skeleton obtained by anionic polymerization.

In recent years, the utility of graft copolymers as a modifier for polymeric materials has been recognized. Graft copolymers are added to, for example, resin compositions composed of different resins, in order to improve their mechanical strengths, etc.

As one of the processes for producing a graft copolymer, there is known a process which comprises copolymerization of a high-molecular monomer having a polymerizable group at one end in the molecule (this monomer is generally called a macromolecular monomer) with another copolymerizable monomer (said process is hereinafter referred to as the macromolecular monomer process). The macromolecular monomer process can produce a graft copolymer at a high efficiency, and accordingly has drawn special attention recently.

In the case of the macromolecular monomer process, a macromolecular monomer of narrow molecular weight distribution provides a graft copolymer having uniform length branches and well-defined structure. Because this kind of graft copolymer has excellent properties, the macromolecular monomer of narrow molecular weight distribution has a high industrial value.

The skeletal polymer of macromolecular monomer is synthesized by usual polymerization methods: radical polymerization, anionic polymerization, cationic polymerization, etc. In order to produce a macromolecular monomer of narrow molecular weight distribution, anionic polymerization has generally been employed though a particular polymerization initiator is selected and used according to kind of monomers used.

For example, a macromolecular monomer having a polystyrene skeleton is synthesized by a process which comprises anionic living polymerization of styrene initiated by butyllithium, followed by the reaction with an end-capping agent bearing a polymerizable group such as vinyl group or the like (U.S. Pat. No. 3,842,059 and Japanese Patent Application Laid-Open No. 21486/1972).

In contrast, an alkyl (meth)acrylate, when polymerized by using butyllithium as an anionic polymerization initiator, causes side reactions and is unable to give a polymer of narrow molecular weight distribution.

To suppress side reactions and produce monodispersed poly(meth)acrylate macromolecular monomer, there is known a process which comprises polymerization of methyl methacrylate with another initiator like 1,1-diphenylhexyllithium and converting the resulting living polymer to a macromolecular monomer (Macromolecules, 14, p. 1599, 1981).

In the production of a macromolecular monomer by end-capping method as mentioned above, however, the living polymer tends to lose the end activity in the course of the propagation and react with the end-capping agent no longer. Therefore the resulting macromolecular monomer tends to contain molecules having no polymerizable group.

In order to solve this problem, there are proposals, for example, a process which comprises carrying out anionic polymerization by using, as an anionic polymerization initiator, a Grignard reagent having a polymerizable group such as vinylbenzyl group or the like (Polym. J., 18, p. 581, 1986), and a process which comprises carrying out group transfer polymerization by using vinylphenylketenetrimethylsilylacetal or the like together with cocatalyst (Japanese Patent Application Laid-Open No. 62801/1987). In these processes, the living polymers obtained have a polymerizable group derived from the initiator used and the macromolecular monomer produced have a high purity.

The above processes, however, need to employ a very low polymerization temperature, for example, $-30°$ to $-78°$ C. and are not appropriate for industrial production of a macromolecular monomer.

Anionic polymerization at room temperature without causing any side reaction is possible according to a process which comprises anionic polymerization of a (meth)acrylic acid ester by using a quaternary ammonium salt of resonance stabilized carbanion as a polymerization initiator, which process was proposed by Dr. Reetz et al. in Japanese Patent Application Laid-Open No. 69605/1989 corresponding to European Patent Application Laid-Open No. 0306714. However, it has been unknown at all whether or not the above anionic polymerization process is applicable to the synthesis of a macromolecular monomer.

It is an object of the present invention to provide a process for producing a macromolecular monomer of narrow molecular weight distribution having a poly(meth)acrylic acid ester skeleton, at a high purity and easily.

The present inventors found that a macromolecular monomer of narrow molecular weight distribution can be obtained at a high purity by use of a quaternary ammonium salt of particular carbanion which belongs to those proposed by Dr. Reetz et al. as an anionic polymerization initiator for (meth)acrylic acid esters but which is neither disclosed nor suggested in the proposal. The finding has led to the completion of the present invention.

The present invention resides in a process for producing a macromolecular monomer, which comprises anionic polymerization of a (meth)acrylic acid ester monomer by using, as a polymerization initiator, a compound represented by the following general formula [I]:

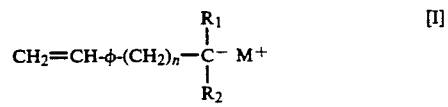

$$CH_2=CH-\phi-(CH_2)_n-\underset{R_2}{\overset{R_1}{\underset{|}{\overset{|}{C}}}}- M^+ \quad [I]$$

wherein $M^+$ is a quanternary ammonium ion; $\phi$ is a phenylene group; $R_1$ and $R_2$ are each an electron withdrawing group stabilizing the carbanion $C^-$, or one of them is said electron withdrawing group and the other is an alkyl group of 1-6 carbon atoms or a phenyl group; and n is an integer of 0-6.

The present invention is hereinafter described in more detail.

Polymerization initiator

The polymerization initiator used in the present invention is a quaternary ammonium salt compound represented by the above-mentioned general formula [I]. In the general formula [I], specific examples of the electron withdrawing group used as $R_1$ and $R_2$ are $-COOR$, $-COR$, $-CON(R)_2$, $-COSR$, $-CN$ and $-NO_2$. The R in these groups is an alkyl group or an aryl group, preferably an alkyl group of 1-6 carbon atoms or a phenyl group.

$R_1$ and $R_2$ may be each an electron withdrawing group, or one of them may be an electron withdrawing group and the other may be an alkyl group of 1-6 carbon atoms or a phenyl group. When both of $R_1$ and $R_2$ are an electron withdrawing group, they may be the same or different.

In the general formula [I], the negative charge on the carbanionic carbon $(C^-)$ is delocalized by the electron withdrawing group(s) bonded to this carbon. Such a carbanion is more stable than a carbanion whose negative charge is localized.

As the anion constituting the compound represented by the general formula [I], there are preferred anions derived from vinylbenzyl compounds such as dimethyl vinylbenzylmalonate, diethyl vinylbenzylmalonate, vinylbenzylacetylacetone, ethyl vinylbenzylacetoacetate, methyl vinylbenzylcyanoacetate, ethyl vinylbenzylcyanoacetate, 1-vinylbenzyl-1-nitroethane, 1-vinylbenzyl-1-nitropropane, vinylbenzyldicyanomethane and the like.

As the quaternary ammonium ion, there are mentioned tetramethylammonium ion, tetraethylammonium ion, trimethylbenzylammonium ion, trimethyldodecylammonium ion, tetrabutylammonium ion, dimethylpiperidinium ion, dimethylmorpholinium ion, etc. Preferred are tetraalkylammonium ions such as tetramethylammonium ion, tetraethylammonium ion, tetrabutylammonium ion and the like.

In the general formula [I], $\phi$ is a phenylene group as mentioned above. In the phenylene group, at least one of the hydrogen atoms may be substituted by alkyl group(s) of 1-6 carbon atoms.

Next, description is made on the process for producing the above polymerization initiator.

For example, diethyl 2-(p-vinylbenzyl)malonate is reacted with sodium hydride (NaH) in other solvent to substitute the hydrogen atom bonded to the malonic acid skeleton of diethyl 2-(p-vinylbenzyl)malonate, with sodium atom, and the resulting compound is reacted with tetrabutylammonium bromide or the like to obtain tetrabutylammonium-(p-vinylbenzyl)diethoxycarbonylmethanide which is one of the initiators usable in the present invention.

Tetrabutylammonium-(p-vinylbenzyl)diethoxycarbonylmethanide can also be synthesized by reacting diethyl 2-(p-vinylbenzyl)malonate with a molar equivalent of tetrabutylammonium hydroxide in an alcohol solvent at room temperature and then removing the formed water by distillation under reduced pressure. In the distillation under reduced pressure, it is preferable to interpose a drying tower containing phosphorus pentoxide or the like, between a reactor and a vacuum pump.

The above process using tetralkylammonium hydroxide can produce an intended compound in a pure form containing no solvent. Therefore, using the resultant compound as an anionic polymerization initiator enables wide selection for a polymerization solvent.

Furthermore, when there is used a vinylbenzyl compound other than diethyl 2-(p-vinylbenzyl)malonate, represented by the following general formula [II], it is possible to obtain a polymerization initiator having a structure corresponding to that of the starting material used, in a manner similar to the above.

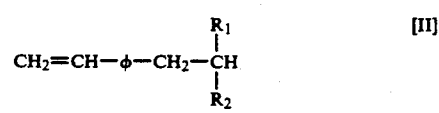

In the above formula, $R_1$ and $R_2$ have the same definition as given with respect to the general formula [I].

Production of macromolecular monomer

In the present invention, the monomer to be polymerized anionicaly to obtain a macromolecular monomer is a (meth)acrylic acid ester.

Specific examples of the monomer are methyl (meth)acrylate, ethyl (meth)acrylate, butyl (meth)acrylate, isobutyl (meth)acrylate, tert-butyl (meth)acrylate, octyl (meth)acrylate, 2-ethylhexyl (meth)acrylate, isononyl (meth)acrylate, stearyl (meth)acrylate, isobornyl (meth)acrylate, behenyl (meth)acrylate, phenyl (meth)acrylate, cyclohexyl (meth)acrylate, benzyl (meth)acrylate, 2-acetoxyethyl (meth)acrylate, 3-methoxypropyl (meth)acrylate, 2,2,2-trifluoroethyl (meth)acrylate and 2-dimethylaminoethyl (meth)acrylate.

The polymerization should be carried out in an atmosphere of inert gas in the absence of water. The polymerization temperature is suitably $-30°$ to $75°$ C., preferably $0°-60°$ C.

The molecular weight of the macromolecular monomer is controlled by the molar ratio of the polymerization initiator and the monomer fed. For example, when it is intended to obtain a polybutyl acrylate macromolecular monomer having a number-average molecular weight of about 2,000-10,000, there can be used butyl acrylate in a proportion of 10-80 moles per mole of an initiator. When there is obtained a polymethyl methacrylate macromolecular monomer having a number-average molecular weight of about 2,000-10,000, there can be used methyl methacrylate in a proportion of 15-100 moles per mole of an initiator.

As the polymerization solvent, there can be mentioned ethers (e.g., diethyl ether, and tetrahydrofuran), esters (e.g., ethyl acetate), acetonitrile, dimethylformamide, benzene, toluene, etc. The preferable monomer concentration in polymerization solution is 5-60% by weight.

The polymerization is substantially complete ordinarily in about 1-4 hours. It is preferable that before the formed polymer is taken out, diluted hydrochloric acid or the like is added in an excess relative to the moles of the polymerization initiator used, to deactivate the living propagating end.

The synthesized macromolecular monomer can be taken out according to the separation procedure disclosed in the above Japanese Patent Application Laid-Open No. 69605/1989, i.e., the solvent extraction using diethyl ether or the like.

The present invention is hereinafter described more specifically by showing Referential Example and

EXAMPLES

Referential Example

Synthesis of polymerization initiator, tetrabutylammonium-(p-vinylbenzyl)diethoxycarbonyl-methanide Into a flask containing 100 ml of dry ethanol were fed 2.43 g (0.106 mole) of metallic sodium, 50.77 g (0.317 mole) of diethyl malonate and 16.12 g (0.106 mole) of p-vinylbenzyl chloride in dry nitrogen gas atmosphere. The mixture was subjected to reaction at the reflux temperature for 3 hours. 100 ml of pure water was added to the reaction mixture to dissolve the sodium chloride (NaCl) generated by the reaction. Extraction was carried out with three 100 ml-portions of methylene chloride to obtain a methylene chloride solution of the product, i.e., diethyl 2-(p-vinylbenzyl)malonate.

The methylene chloride solution was dehydrated over anhydrous sodium sulfate. Thereto was added a radical polymerization inhibitor, and the mixture was subjected to vacuum distillation. The fraction distilled under 140° C/0.1 mmHg was measured for NMR spectrum and identified to be diethyl 2-(p-vinylbenzyl)malonate. The amount obtained was 20.55 g (yield: 70.1%).

0.3 g of sodium hydride (NaH) and 30 ml of anhydrous tetrahydrofuran (hereinafter referred to as THF) were fed into a two-necked flask whose gaseous phase had been purged with dry nitrogen gas. Stirring was carried out to disperse sodium hydride in THF. Thereto was dropwise added 3.45 g of diethyl 2-(pvinylbenzyl)-malonate. After the generation of hydrogen gas had ceased, stirring was carried out further for 5 minutes to complete the reaction between sodium hydride and diethyl 2-(p-vinylbenzyl)malonate.

To this reaction mixture was added 4.03 g of tetrabutylammonium bromide, and stirring was carried out for 40 minutes to synthesize the intended tetrabutylammonium-(p-vinylbenzyl)diethoxycarbonylmethanide. The resulting reaction mixture was filtered with a glass filter in nitrogen gas atmosphere to remove the sodium bromide (NaBr) formed as a by-product to obtain a THF solution of the intended initiator.

Example 1

Production of polybutyl acrylate macromolecular monomer

The THF solution of the initiator obtained in Referential Example was fed, in an amount of 12.5 millimoles in terms of the initiator, into a two-necked flask whose gaseous portion had been purged with dry nitrogen gas. Thereto was dropwise added 33 g (0.256 mole) of butyl acrylate in 10 minutes.

Simultaneously with the start of the addition of butyl acrylate, butyl acrylate initiated polymerization, and the solution temperature reached 51° C. (the highest temperature) and the solution viscosity increased. After the completion of the addition of butyl acrylate, stirring was carried out for 40 minutes to complete the polymerization.

To the resulting polymer solution was added 18% hydrochloric acid, and stirring was carried out for 10 minutes. Then, extraction was carried out by using diethyl ether to extract the polymer into the diethyl ether layer side. The diethyl ether layer was washed with water three times and dehydrated over anhydrous sodium sulfate. Thus, 35.7 g of a polybutyl acrylate macromolecular monomer having a styryl group at one end of the molecule was obtained.

Gel permeation chromatography (hereinafter referred to as GPC) indicated that the macromolecular monomer had Mn=2,500, Mw=2,900 and Mw/Mn=1.16. Furthermore, the measurement of NMR spectrum indicated that the proportion of the polymer having a styryl group (the purity of the macromolecular monomer) was 98 mole %.

Example 2

Production of polymethyl acrylate macromolecular monomer

Polymerization was carired out in the same manner as in Example 1 except that 16.1 g of methyl acrylate was used, whereby 18.8 g of a polymethyl acrylate macromolecular monomer having a styryl group was obtained.

It was found that the macromolecular monomer had Mn=1,400, Mw=1,670 and Mw/Mn=1.19 and that the proportion of the polymer having a styryl group (the purity of the macromolecular monomer) was 98 mole %.

Example 3

Production of polymethyl methacrylate macromolecular monomer 30 ml of THF solution containing 4.17 millimoles of the initiator obtained in Referential Example was fed into a two-necked flask. Thereto was dropwise added slowly a mixture of 30 ml of THF and 62.5 g (0.625 mole) of methyl methacrylate, so that the temperature of the resulting mixture did not exceed 30° C.

With the dropwise addition, the solution viscosity increased. In 6 hours from the start of the reaction, 18% hydrochloric acid was added and stirring was carried out for 10 minutes. Thereafter, the formed polymer was extracted by using methylene chloride to obtain 60.8 g of a polymethyl methacrylate macromolecular monomer.

It was found that the macromolecular monomer had Mn=14,300, Mw=18,500 and Mw/Mn=1.29 and that the purity of the macromolecular monomer was 97 mole %.

As clear from the above Examples, the present process using a particular polymerization initiator having a polymerizable group, as compared with the conventional processes using an end-capping agent to introduce a polymerizable group into a macromolecular monomer, can introduce the polymerizable group into a macromolecular monomer at a higher proportion. Moreover, the present process makes it possible to polymerize a (meth)acrylic acid ester monomer anionicaly even at room temperature without causing any side reaction.

Accordingly, the present process is a useful process for industrial production of a (meth)acrylic acid ester macromolecular monomer of narrow molecular weight distribution and high purity.

What is claimed is:

1. A process for producing a macromolecular monomer, which comprises anionic polymerization of a (meth)acrylic acid ester monomer by using, as a polymerization initiator, a compound represented by the following general formula [I]:

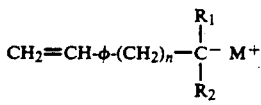

wherein M+ is a quaternary ammonium ion; φ is a phenylene group; $R_1$ and $R_2$ are each an electron withdrawing group stabilizing the carbanion C−, or one of them is said electron withdrawing group and the other is an alkyl group of 1–6 carbon atoms; and n is an integer of 0–6.

2. A process for producing a macromolecular monomer, according to claim 1, wherein the electron withdrawing group is a group selected from the group consisting of —COOR, —COR, —CON(R)$_2$, —COSR, wherein R is an alkyl group of 1–6 carbon atoms or a phenyl group, —CN and —NO$_2$.

3. A process for producing a macromolecular monomer, according to claim 1, wherein in the general formula [I], both $R_1$ and $R_2$ are —COOR, wherein R is an alkyl group of 1–6 carbon atoms or a phenyl group; n is 1; and M+ is a tetraalkylammonium ion.

4. A process for producing a macromolecular monomer, according to claim 1, wherein the (meth)acrylic acid ester monomer is selected from the group consisting of methyl (meth)acrylate, ethyl (meth)acrylate, butyl (meth)acrylate, isobutyl (meth)acrylate, tert-butyl (meth)acrylate, octyl (meth)acrylate, 2-ethylhexyl (meth)acrylate, isononyl (meth)acrylate, stearyl (meth)acrylate, isobornyl (meth)acrylate, behenyl (meth)acrylate, phenyl (meth)acrylate, cyclohexyl (meth)acrylate, benzyl (meth)acrylate, 2-acetoxyethyl (meth)acrylate, 3-methoxypropyl (meth)acrylate, 2,2,2-trifluoroethyl (meth)acrylate and 2-dimethylaminoethyl (meth)acrylate.

* * * * *